Aug. 5, 1952  C. E. BECK  2,605,998
PORTABLE HYDRAULIC JACK
Filed March 1, 1949  2 SHEETS—SHEET 2
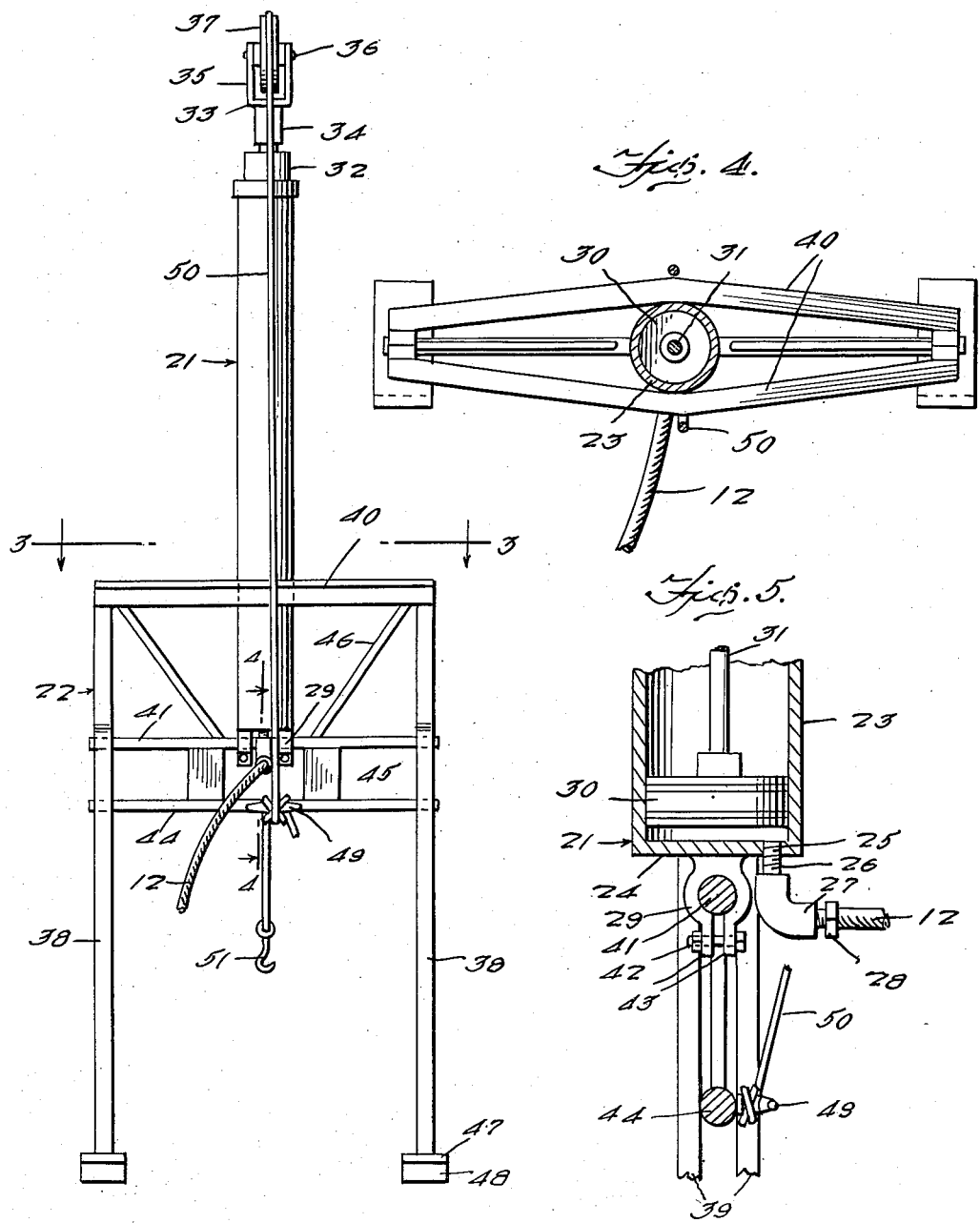
INVENTOR.
Clarence E. Beck
BY
McMorrow, Berman & Davidson
ATTORNEYS Patented Aug. 5, 1952

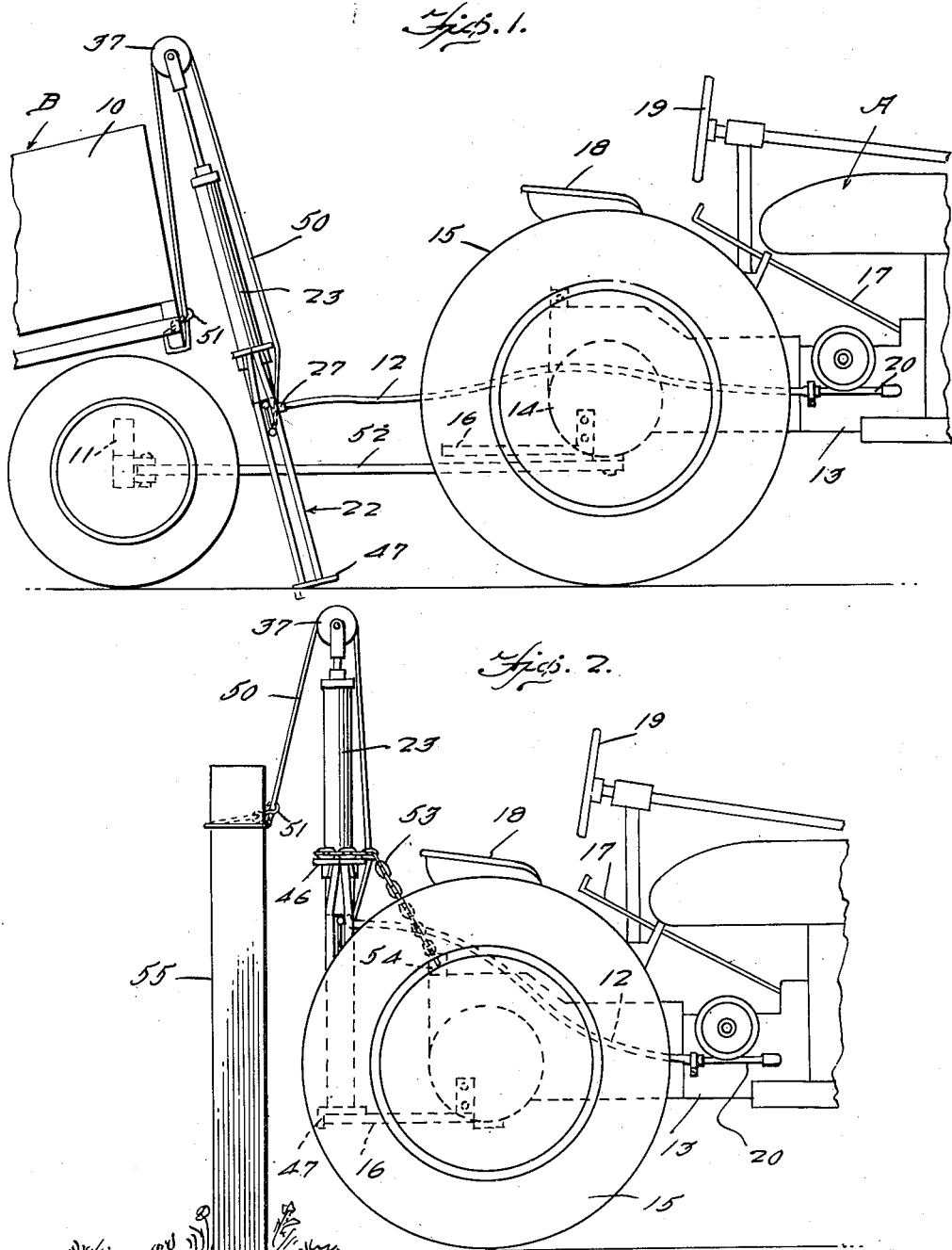

2,605,998

UNITED STATES PATENT OFFICE 2,605,998

PORTABLE HYDRAULIC JACK

Clarence E. Beck, Tipton, Ind.

Application March 1, 1949, Serial No. 78,916

2 Claims. (Cl. 254—1)

This invention relates to portable hydraulic jacks, and more particularly to a portable jack which can be operated by hydraulic fluid under pressure from the hydraulic system of a conventional farm tractor, and provides a high lift of large power for up-ending wagon beds to dump the contents thereof, pulling fence posts and stakes, and other purposes.

It is among the objects of the invention to provide an improved portable, hydraulic jack which can be operated from a mounting on the ground or on a tractor drawbar or other suitable support, which will straddle a wagon tongue or other object so that the wagon bed can be raised or up-ended without applying the load to the wagon tongue, which can be mounted on a tractor drawbar or rear axle and carried by the tractor for pulling fence posts or stakes or lifting objects, such as stones, boxes, bales of material, and vehicles, which provides an extremely high lift with a very large force from the fluid pressure of a tractor hydraulic system, and which is simple and durable in construction, of light weight and easy to carry, and extremely economical to manufacture.

Other objects and advantages will become apparent from a consideration of the following description and the appended claims in conjunction with the accompanying drawings, wherein:

Figure 1 is a somewhat diagrammatic view showing, in side elevation, the hydraulic jack in use to up-end a wagon bed, a fragmentary rear portion of a tractor and a fragmentary front portion of a wagon being shown in side elevation;

Figure 2 is a somewhat diagrammatic view showing the jack used to pull a fence post or stake, the jack, the stake, and a fragmentary rear portion of a jack-supporting tractor being shown in side elevation;

Figure 3 is a front elevation of a portable jack;

Figure 4 is a transverse cross-section on the line 3—3 of Figure 3; and

Figure 5 is a fragmentary, longitudinal cross-section on the line 4—4 of Figure 3.

With continued reference to the drawings, and particularly to Figure 1, there is illustrated a conventional farm tractor, generally indicated at A, a tractor-towed wagon, generally indicated at B with a portable hydraulic jack, illustrative of the invention operatively disposed to up-end the wagon bed 10 from the wagon frame 11 and operatively connected to the tractor hydraulic system by an extension conduit 12.

The tractor A may be a conventional farm tractor having a frame 13 supporting an engine, not illustrated, and including the usual transmission mechanism, this frame being supported at its rear end on a rear axle 14 carried by the tractor rear wheels 15 and containing the usual differential mechanism drivingly connected with the transmission mechanism in the frame. A U-shaped drawbar 16 extends rearwardly from the rear axle 14 and is substantially horizontally-disposed. The tractor frame 13 also includes a hydraulic system, including a pump and a valve, neither of which is illustrated in the drawings, but which are of well-known construction. The valve is controlled by a manually-operated lever 17 projecting out of the tractor frame to a location convenient to the tractor seat 18 and steering wheel 19, and the outlet of the valve is connected to an external conduit 20 which extends rearwardly along the tractor frame for connection to any tractor-operated lift mechanism.

By operation of the valve lever 17, the conduit 20 may be connected with the outlet of the tractor-driven hydraulic pump, may be connected with the inlet of the pump or with a hydraulic sump, or may be blocked so that hydraulic fluid will not flow in either direction through the conduit.

The portable, hydraulic jack, particularly illustrated in Figures 3, 4 and 5 comprises, in general, an elongated, expansible chamber device 21 and a frame base 22.

The expansible chamber device 21 comprises an elongated cylinder 23 having at its bottom end a bottom wall 24 provided with a screw-threaded aperture 25 into which is threaded a pipe nipple 26. An elbow 27 is threaded onto the outer end of the nipple 26 and the extension hose or conduit 12 is connected to the elbow 27 by a suitable union fitting 28. A pair of split clamps 29 having substantially circular apertures therethrough extends outwardly from the outer side of the bottom wall 24 for a purpose which will presently appear.

A piston 30 is reciprocable in the cylinder 23 above the bottom end wall 24, and a piston rod 31 is connected at its lower end to the piston 30 and extends out of the top end of the cylinder 23 through an apertured cap 32 which is secured on the upper, open end of the cylinder and serves as a guide for the piston rod. A bracket 33 is secured on the upper end of the piston rod 31 and comprises a sleeve portion 34 receiving the piston rod at the upper end of the latter, and a bifurcated portion providing a pair of spaced-apart, substantially parallel legs 35 provided with mutually-aligned, respective apertures near their ends remote from the sleeve 34. An axle 36 is received at its ends in the apertures in legs 35, and a crown sheave 37 is disposed between the legs 35 and journaled on the axle 36.

The frame base 22 comprises a pair of spaced-apart, substantially parallel, coterminous standards 38, each of which may conveniently comprise two substantially parallel, spaced-apart angle irons 39.

The two angle irons 39 of each standard 38 are converged together at the upper ends of the standards, and a pair of cross-frame members 40 extends between the corresponding upper ends of the two standards 38, and are secured at their ends to the corresponding angle irons 39 of the standards. The two cross-frame members 40 are preferably angle irons of the same size as the angle irons 39, of the frame, and are mutually aligned in a plane perpendicular to both of the standards 38. These cross frame members 40 are bowed outwardly, however, away from each other and receive the cylinder 23 therebetween substantially at their mid-length locations, as is clearly illustrated in Figure 4.

A cross-bar 41 extends between the two standards 38 at a located space below the cross-frame members 40, and is substantially parallel to the cross-frame members. This cross-bar 41 extends through the two split brackets 29 on the bottom end of the cylinder 23, and the brackets are clamped upon this cross-bar by respective clamp bolts 42 which extend through spaced-apart, apertured lugs 43 provided on each bracket.

A second cross-bar 44 extends between the standards 38 a short distance below and substantially parallel to the cross-bar 41. Two reinforcing plates 45 extend between the cross-bars 41 and 44 at respectively opposite sides of the bottom end of the cylinder 23, and respective diagonal braces 46 extend from the cross-bar 41 to the upper ends of the standards 38, the lower ends of these braces being connected to the upper cross-bar 41 near the opposite sides of the lower end of the cylinder.

This provides a strong and rigid H or A-shaped base frame in which the lower cross-bar 44 is positioned above the mid-length locations of the two standards 38 leaving a large, clear space between this cross-bar and the bottom ends of the standards. Respective footplates 47 are secured to the bottom ends of the standards 38 and each of these footplates is provided at one edge with a depending flange 48, these flanges being substantially parallel to a plane passing medially between the two angle irons 39 of each of the two standards 38.

A cleat 49 is secured to the lower cross-bar 44 at one side of the latter, and a cable 50 is suspended over the crown sheave 37 and has one of its depending portions connected to the cleat 49. A hook 51, or other suitable attaching means, is connected to the end of the other depending portion of the cable for connecting the cable to an object to be lifted, and this hook will be raised when the piston 30 is forced upwardly in the cylinder 23 upon the admission of hydraulic fluid under pressure into the bottom end of the cylinder through the extension hose 12.

It will be noted that for every inch the piston and crown sheave 37 are raised, the hook 51 will be raised two inches, because of the doubled condition of the cable 50.

Returning now to Figure 1, when it is desired to use the jack to up-end a wagon bed to dump the contents thereof, the base frame 22 of the jack is positioned at the front end of the wagon, straddling the wagon tongue 52, with the depending portion of the cable 50 to which the hook is attached adjacent the front end of the wagon bed 10. The hook end of the cable is engaged with the bottom of the front end of the wagon bed, the footplates 47 of the jack base frame being supported on the ground adjacent the front end of the wagon. Now, with the extension hose 12 connected to the outlet conduit 20 and to the elbow 21, the valve-control lever 17 is manipulated to open the valve and connect the conduit 20 with the outlet of the hydraulic pump and, assuming that the tractor engine is in operation, hydraulic fluid will be pumped into the lower end of the cylinder 23, raising the crown sheave 37 which pulls on the cable 50 and raises the hook end of the cable, the cable being connected adjacent its opposite end to the cleat 49. The jack will incline more-or-less toward the front end of the wagon bed as the front end of the wagon bed is raised, keeping the depending portion of the cable 50 to which the hook is attached, substantially vertical, so that a maximum lift force will be applied to the wagon bed. The height of the jack is such that when fully extended, it will lift the wagon bed to a high angle of inclination to effectively dump the contents of the bed therefrom.

When it is desired to use the jack for pulling posts or stakes or lifting various objects, and at the same time, have the jack mounted on and portable with the tractor, the footplates 47 of the jack are mounted on the drawbar 16 of the tractor, or may, in some cases, be mounted directly on the tractor rear axle, and the jack is connected to the tractor by suitable means, such as the chain 53 which is passed around the jack cylinder 23 immediately above the top cross members 40 and secured at its ends to respective brackets or ears 54 secured to some substantial part of the tractor.

With the jack so mounted, the hook-attached end of the cable 50 may be wrapped around an object, such as the fence post 55, and the valve lever 17 manipulated to apply hydraulic fluid under pressure to the bottom end of the jack cylinder below the piston 30, whereupon the crown sheave 37 will be raised, pulling on the cable 50 and pulling the stake 55 up out of the ground.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A portable hydraulic jack comprising a frame base and an expansible chamber device rigidly secured to and carried by said frame base, said frame base comprising a pair of spaced-apart, coterminous standards each including a pair of spaced-apart angle irons brought together at corresponding ends, a pair of coplanar cross members extending between corresponding ends of said standards at which said angle irons are brought together and receiving said expansible chamber device therebetween substantially at their mid-length location, a cross-bar extending between said standards spaced from and substantially parallel to said cross members, split clamp means on the bottom end of said expansible chamber device rigidly connecting said device to said cross-bar, brace means extending from said cross-bar to said standards respectively, and footplates secured one on each standard at the ends of said standards opposite the ends connected to said cross members.

2. A portable hydraulic jack comprising a frame base and an expansible chamber device rigidly secured to and carried by said frame base, said frame base comprising a pair of spaced-apart, coterminous standards each including a pair of spaced-apart angle irons brought together at their corresponding ends, a pair of coplanar cross members extending between corresponding ends of said standards at which said angle irons are brought together and receiving said expansible chamber device therebetween substantially at their mid-length location, an upper cross-bar extending between said standards spaced from and substantially parallel to said cross members, means rigidly connecting said upper cross-bar to the adjacent end of said expansible chamber device, brace means extending from said cross-bar to said standards respectively, a lower cross-bar extending between said standards below and substantially parallel to said upper cross-bar, reinforcing plates extending between said cross-bars at respectively opposite sides of the bottom end of said expansible chamber device, and footplates secured one on each of said standards at the ends of said standards opposite the ends connected to said cross members.

CLARENCE E. BECK.

REFERENCES CITED

The following references are of record in the file of this patent:

UNITED STATES PATENTS

| Number | Name | Date |
|---|---|---|
| 2,214,440 | Rothery | Sept. 10, 1940 |
| 2,459,506 | Dempster et al. | Jan. 18, 1949 |
| 2,549,996 | Walsh | Apr. 24, 1951 |